(12) United States Patent
Reny et al.

(10) Patent No.: US 11,395,477 B2
(45) Date of Patent: Jul. 26, 2022

(54) ILLUMINATED PET HARNESS

(71) Applicants: Carlene Reny, Boynton Beach, FL (US); Linda Payette, Boynton Beach, FL (US)

(72) Inventors: Carlene Reny, Boynton Beach, FL (US); Linda Payette, Boynton Beach, FL (US)

( * ) Notice: Subject to any disclaimer, the term of this patent is extended or adjusted under 35 U.S.C. 154(b) by 0 days.

(21) Appl. No.: 17/443,748

(22) Filed: Jul. 27, 2021

(65) Prior Publication Data

US 2022/0022424 A1    Jan. 27, 2022

Related U.S. Application Data

(60) Provisional application No. 63/056,753, filed on Jul. 27, 2020.

(51) Int. Cl.
| *A01K 27/00* | (2006.01) |
| *F21V 23/04* | (2006.01) |
| *F21S 9/02* | (2006.01) |
| *F21V 21/088* | (2006.01) |

(52) U.S. Cl.
CPC .......... *A01K 27/006* (2013.01); *A01K 27/002* (2013.01); *F21S 9/02* (2013.01); *F21V 21/088* (2013.01); *F21V 23/04* (2013.01)

(58) Field of Classification Search
CPC .... A01K 27/006; A01K 27/00; A01K 27/002; F21V 33/0008; A41D 27/085; A41D 13/01
See application file for complete search history.

(56) References Cited

U.S. PATENT DOCUMENTS

| 5,630,382 | A | 5/1997 | Barbera et al. | |
| 7,008,075 | B2* | 3/2006 | Simoni | A01K 27/006 |
| | | | | 362/108 |
| 7,318,393 | B2 | 1/2008 | Ayscue | |
| 8,960,948 | B2* | 2/2015 | Ford | A01K 27/006 |
| | | | | 362/108 |
| 9,139,157 | B1 | 9/2015 | Leung et al. | |
| D805,261 | S | 12/2017 | Yun | |
| 10,271,521 | B2 | 4/2019 | Chen | |
| 10,271,522 | B2 | 4/2019 | Chen | |
| 11,178,922 | B1* | 11/2021 | Allen | A41F 3/00 |
| 2005/0217611 | A1 | 10/2005 | Morehead | |

(Continued)

*Primary Examiner* — Kristen C Hayes
(74) *Attorney, Agent, or Firm* — Mark C. Johnson; Johnson Dalal

(57) ABSTRACT

An illuminating pet harness that includes a body section defining a selectively adjustable upper torso aperture, two selectively adjustable side apertures, having a chest portion of a padded material and an inner surface and an outer surface. Also, the invention includes a first light assembly and a second light assembly that each include a clip member selectively removably coupled to the outer surface of the body section and having a lighting element electrically coupled to a battery-powered power source. The lighting element on the first lighting is disposed on a light housing pivotably coupled to the clip member of the first light assembly and the outer surface of the body section. The first lighting element is also operably configured to be oriented with respect to the second lighting element to emit light at a substantially perpendicular angle θ therefrom.

21 Claims, 6 Drawing Sheets

(56) References Cited

U.S. PATENT DOCUMENTS

| | | | |
|---|---|---|---|
| 2005/0225964 A1* | 10/2005 | Simoni | G08B 5/38 |
| | | | 362/103 |
| 2007/0107672 A1* | 5/2007 | Von Czenkow | A01K 27/006 |
| | | | 119/859 |
| 2007/0177376 A1* | 8/2007 | Simoni | F21L 4/00 |
| | | | 362/157 |
| 2011/0271913 A1* | 11/2011 | Min | A01K 27/002 |
| | | | 119/856 |
| 2013/0128556 A1 | 5/2013 | Brauser et al. | |
| 2015/0313182 A1 | 11/2015 | Overman | |
| 2017/0114963 A1* | 4/2017 | Villalobos | F21L 4/02 |
| 2017/0215386 A1 | 8/2017 | Pianelli | |
| 2017/0219191 A1* | 8/2017 | Fitzgerald | A01K 27/006 |
| 2019/0374122 A1* | 12/2019 | Kuenzi | A01K 27/002 |
| 2021/0127638 A1* | 5/2021 | Kornegay | A01K 27/006 |

* cited by examiner

ILLUMINATED PET HARNESS

FIELD OF THE INVENTION

The present invention relates generally to harnesses for attachment to a pet, e.g., a dog, and, more particularly, relates to a pet harness that can illuminate its ambient surroundings.

BACKGROUND OF THE INVENTION

Pet parents, particularly those owning canines, must routinely and habitually walk their dog outside the home to ensure the animal receives the proper degree of exercise and social interaction, and, of course, the ability to relieve itself at least twice a day, morning and night, though this number is oftentimes a lot higher, e.g., three to four times a day. With respect to puppies, dogs that are not properly house trained, and canines that suffer from particular health conditions, pet parents may find themselves having to walk their dogs outside more often, including in the late afternoon, early morning, or nighttime hours. In such cases, the difficulty of safely and expeditiously walking one's pet substantially increases given the lack of proper lighting in illuminating not only the dog's path but its surroundings, as well. Lack of proper lighting raises several health and safety concerns for a pet parent. First, allowing a dog to roam in grassy, muddy, or overgrown areas without adequate lighting exposes the animal to a greater risk of interacting with any number of dangerous conditions, e.g., coming in contact with a snake or poisonous frog, stepping on a live wire or sharp object, falling in a ditch, etc. Simply put, owners are unable to avoid a dangerous situation for their pooch if they are unable to see it themselves. Second, municipal ordinances, local regulations, and bylaws propounded by homeowner's associations often require that dog owners pick up after their pet in order to preserve the aesthetic and health of the surrounding landscape and vegetation. Once the sun sets, finding a dog's waste in blades of grass can become close to impossible without a powerful flashlight or other illuminating device that can be aimed directly at the area where the dog was standing. Streetlights and lamp posts seldom provide the type of strong, targeted light that is needed to accomplish this. Lastly, in the event that a dog is roaming off-leash at night, such as when he's knowingly allowed to roam in the backyard, for example, or has escaped without an owner's knowledge, finding the dog can be incredibly difficult if there is nothing illuminating the area, generally, or illuminating the area immediately surrounding the dog. Lack of adequate lighting is, therefore, a pressing and serious need for pet owners.

Existing prior art features illuminating pet harnesses that are characterized by significant limitations. Limitations include the lack of illuminating lights on the belly of an animal (such that the area immediately under the dog is readily visible) as well as on the dog's neck (such that the area immediately in front of the dog is also readily visible), and lighting which is not sufficiently powerful to illuminate the dog's surroundings. Most harness lights are also not selectively adjustable to allow an owner to adjust the angle of the light to illuminate a desired area. Some harnesses are comprised of a non-breathable and non-waterproof material that is not only uncomfortable for the animal during use but is also structurally vulnerable to damage, wear and tear from water exposure, e.g., from rainy conditions, a dog's rolling around in puddles, etc. Additionally, existing prior art does not comprise light assemblies that are selectively removably coupled to the harness body such that an animal may wear the harness without the light assemblies attached thereto during the day, for example, and with the light assemblies attached thereto during the night.

Therefore, a need exists to overcome the problems with the prior art as discussed above.

SUMMARY OF THE INVENTION

The invention provides an illuminating pet harness that overcomes the hereinafore-mentioned disadvantages of the heretofore-known devices and methods of this general type and that effectively, efficiently, and safely illuminates the surrounding area of a pet while walking. As such, an individual (or pet) can guard against dangerous animals, insects, and objects that could harm the pet.

With the foregoing and other objects in view, there is provided, in accordance with the invention, an illuminating pet harness comprising a body section defining a selectively adjustable upper torso aperture, two selectively adjustable side apertures, having a chest portion of a padded material and including an inner surface and an outer surface opposing the inner surface of the chest portion.

In accordance with another feature, an embodiment of the present invention includes a first light assembly having a clip member selectively removably coupled to the outer surface of the body section and having a first lighting element electrically coupled to a battery-powered power source and disposed on a light housing pivotably coupled to the clip member of the first light assembly and the outer surface of the body section; and a second light assembly having a clip member selectively removably coupled to the outer surface of the body section and having a second lighting element electrically coupled to the battery-powered power source, the first lighting element oriented with respect to the second lighting element to emit light at a substantially perpendicular angle $\theta$ therefrom.

In accordance with a further feature of the present invention, the illuminating pet harness also includes a front panel directly coupled to the outer surface of the chest portion and defining a front pocket defining on opposing sides thereof and with a portion of the clip members of the respective first and second light assemblies disposed therein and another portion of the clip members of the respective first and second light assemblies coupled to the front panel.

In accordance with yet another feature, the light housing of the first lighting assembly may be lockably pivotably coupled to the clip member of the first light assembly and the outer surface of the body section.

In accordance with one embodiment of the present invention, the light housing of the first lighting assembly is disposed proximal to the upper torso aperture and the light housing of the second lighting assembly is interposed between the two selectively adjustable side apertures.

In accordance with another embodiment, the chest portion also comprises an upper edge and a lower edge opposing the upper edge, wherein the light housing of the first lighting assembly is disposed proximal to the upper edge and the light housing of the second lighting assembly is disposed proximal to the lower edge.

In accordance with a further feature of the present invention, the illuminating pet harness further comprises a front panel directly coupled to the outer surface of the chest portion and defining a front pocket defining on opposing sides thereof and with a portion of the clip members of the respective first and second light assemblies disposed therein and another portion of the clip members of the respective first and second light assemblies coupled to the front panel.

In accordance with another feature, the body section further includes a plurality of straps coupled to the chest portion and including a selectively adjustable back strap coupled on opposing ends to a selectively adjustable left-side strap and a selectively adjustable right-side strap, the plurality of straps defining the selectively adjustable upper torso aperture and the two selectively adjustable side apertures.

In accordance with an alternate embodiment, the body section further comprises a D-ring coupled, though a leash strap, to the back strap.

In accordance with an exemplary embodiment of the present invention, the illuminating pet harness also includes an electrical switch coupled to a cover of the light housing of the second light assembly and operably configured to complete a circuit electrically coupling the first and second lighting elements to the battery powered power source.

In accordance with another feature, an embodiment of the present invention includes a remote control communicatively coupled to the electrical switch and operably configured to cause completion and disconnection of the circuit and selectively lumen intensity of the first and second lighting elements.

In accordance with a further feature of one embodiment of the present invention, the first and second lighting elements of the first and second light assemblies are electrically coupled to the same battery-powered power source with an electrical wire spanning through a front pocket defined by a front panel directly coupled to the outer surface of the chest portion.

In accordance with an alternate embodiment, the present invention comprises a body section defining a selectively adjustable upper torso aperture, two selectively adjustable side apertures, having a chest portion of a padded material and including an inner surface and an outer surface opposing the inner surface of the chest portion; a first light assembly having a clip member selectively removably coupled to the outer surface of the body section and having a first lighting element electrically coupled to a battery-powered power source and disposed on a light housing pivotably coupled to the clip member of the first light assembly and the outer surface of the body section, the light housing disposed proximal to the upper torso aperture; and a second light assembly having a clip member selectively removably coupled to the outer surface of the body section and having a second lighting element electrically coupled to the battery-powered power source and disposed on a light housing pivotably coupled to the clip member of the second light assembly, the light housing interposed between the two selectively adjustable side apertures and the first and second lighting elements oriented to emit light in different directions.

Although the invention is illustrated and described herein as embodied in an illuminating pet harness, it is, nevertheless, not intended to be limited to the details shown because various modifications and structural changes may be made therein without departing from the spirit of the invention and within the scope and range of equivalents of the claims. Additionally, well-known elements of exemplary embodiments of the invention will not be described in detail or will be omitted so as not to obscure the relevant details of the invention.

Other features that are considered as characteristic for the invention are set forth in the appended claims. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one of ordinary skill in the art to variously employ the present invention in virtually any appropriately detailed structure. Further, the terms and phrases used herein are not intended to be limiting; but rather, to provide an understandable description of the invention. While the specification concludes with claims defining the features of the invention that are regarded as novel, it is believed that the invention will be better understood from a consideration of the following description in conjunction with the drawing figures, in which like reference numerals are carried forward. The figures of the drawings are not drawn to scale.

Before the present invention is disclosed and described, it is to be understood that the terminology used herein is for the purpose of describing particular embodiments only and is not intended to be limiting. The terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically. The term "providing" is defined herein in its broadest sense, e.g., bringing/coming into physical existence, making available, and/or supplying to someone or something, in whole or in multiple parts at once or over a period of time. Also, for purposes of description herein, the terms "upper", "lower", "left," "rear," "right," "front," "vertical," "horizontal," and derivatives thereof relate to the invention as oriented in the figures and is not to be construed as limiting any feature to be a particular orientation, as said orientation may be changed based on the user's perspective of the device. Furthermore, there is no intention to be bound by any expressed or implied theory presented in the preceding technical field, background, brief summary or the following detailed description.

As used herein, the terms "about" or "approximately" apply to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure. In this document, the term "longitudinal" should be understood to mean in a direction corresponding to an elongated direction of the body section of the illuminating pet harness.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and explain various principles and advantages all in accordance with the present invention.

DETAILED DESCRIPTION

Figure 1:
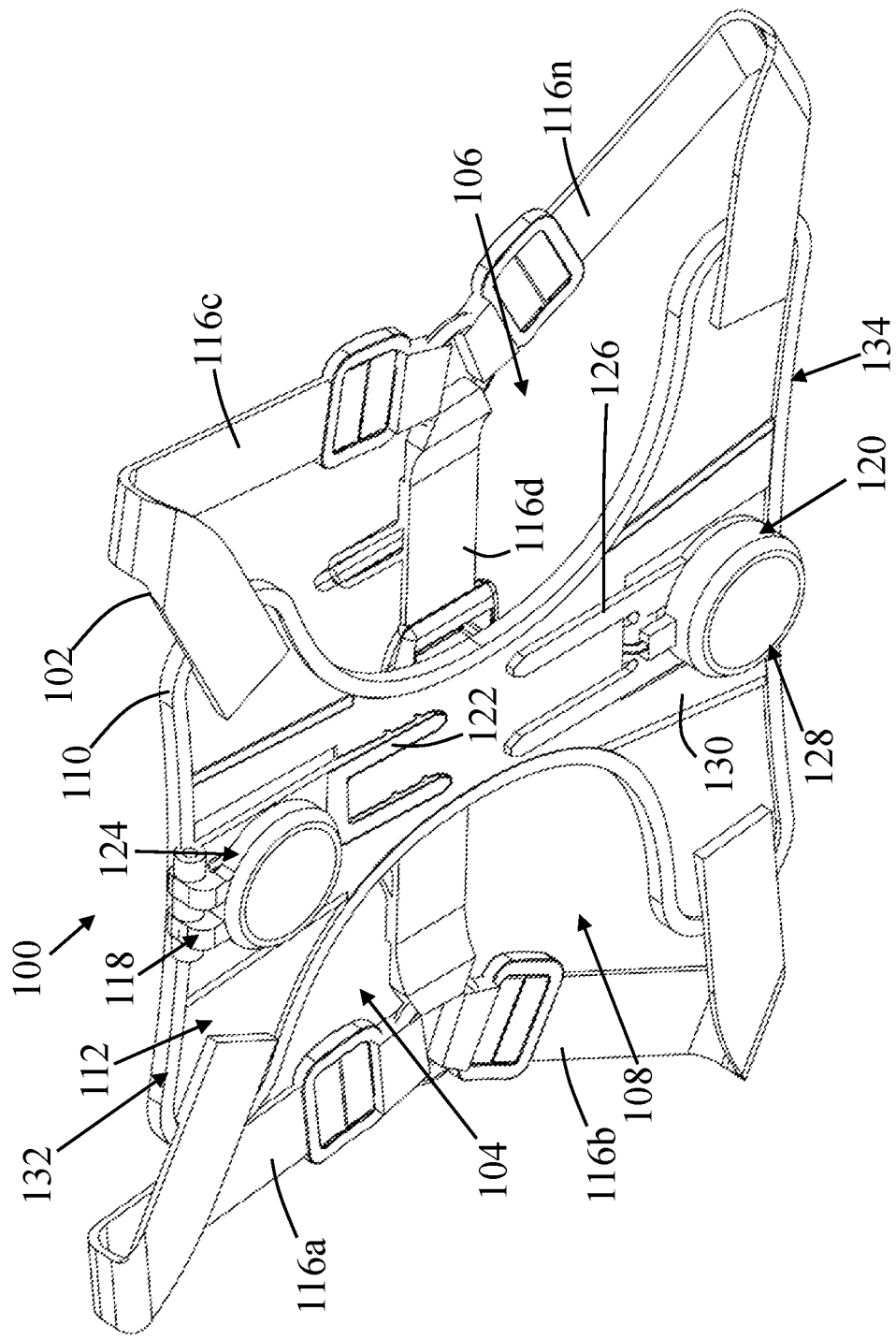
FIG. 1 depicts a perspective bottom view of an illuminating pet harness in accordance with one embodiment of the present invention.

While the specification concludes with claims defining the features of the invention that are regarded as novel, it is believed that the invention will be better understood from a consideration of the following description in conjunction with the drawing figures, in which like reference numerals are carried forward. It is to be understood that the disclosed embodiments are merely exemplary of the invention, which can be embodied in various forms.

Referring now to FIG. 1, one embodiment of the present invention is shown in a perspective bottom view. FIG. 1 (along with other figures) shows several advantageous features of the present invention, but, as will be described below, the invention can be provided in several shapes, sizes, combinations of features and components, and varying numbers and functions of the components. The first example of an illuminated pet harness 100, as shown in FIGS. 1-5, includes a body section 102 defining a selectively adjustable upper torso aperture 104, two selectively adjustable side apertures 106, 108, having a chest portion 110 of a padded material and including an inner surface 400 and an outer surface 112 opposing the inner surface 400 of the chest portion 110. As known in the art, the apertures 104, 106, 108 of the body section 102 may be beneficially selectively adjusted in diameter using, for example, one or more slip locks. Therefore, the illuminated pet harness 100 may accommodate pets of different shapes and sizes. The chest portion 110 of the harness 100 is padded using, for example, a fabric material such as cotton, and in an exemplary embodiment the harness 100 of a canvas fabric material. Canvas is a plain-woven fabric typically made out of cotton and, to a lesser extent, linen. Canvas fabric is known for being durable, sturdy, and heavy duty. By blending cotton with synthetic fibers, canvas can become water resistant or even waterproof, making it an ideal outdoor fabric, particularly for the harness 100. Other deformably resilient materials, however, may be utilized for comfort to the pet (particularly in light of the electronic and structural components used on the outer surface of the harness).

The harness 100 further comprises a first light assembly 118 and a second light assembly 120, the first and second light assemblies 118, 120 selectively removably coupled to the outer surface 112 of the body section 102. This selectively removable feature of the harness 100 distinguishes it from existing prior art where comparable light assemblies are generally fixedly coupled to the harness, eliminating a dog owner's ability to selectively tailor or customize the harness 100 to not have the light assembly coupled thereto.

Figure 6:
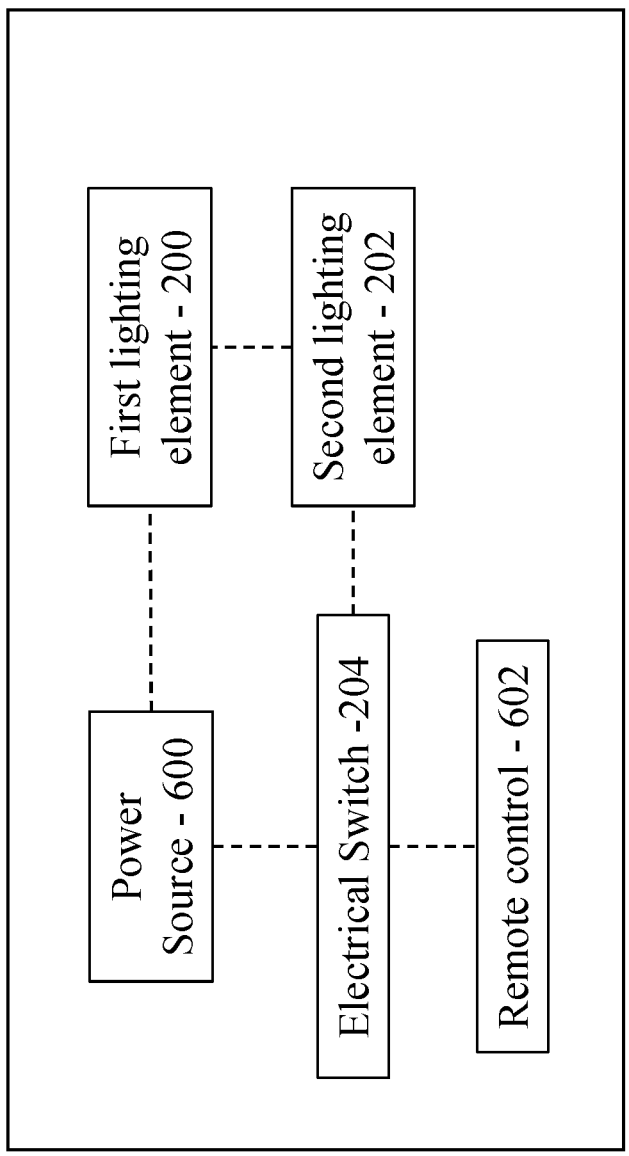
FIG. 6 is a schematic diagram depicting the electrical and communication connectivity of electrical components utilized with the illuminating pet harness, in accordance with one embodiment of the present invention.

Beneficially, the first light assembly 118 includes a first lighting element 200 electrically coupled to a battery-powered power source 600 (as best seen in FIG. 6) e.g., 1-2 double-AA batteries, electrically coupled to light assemblies 118, 120 and disposed on a light housing 124 pivotably coupled to the clip member 122 of the first light assembly 118 and the outer surface 112 of the body section 102. The battery-powered power source 600 may be rechargeable through an AC/DC converter. In other embodiments, the battery-powered power source 600 may be rechargeable using one or more solar cells coupled to the harness 100. The first lighting element 200 is pivotably coupled to the outer surface 112 of the chest portion 110 of the body section 102 and disposed proximal to the upper torso aperture 104. Said another way, the first lighting element 200 may be disposed at or near (within +/−1-2 inches) of a terminal edge that defines the upper torso aperture 104. More specifically, the first lighting element 200 is oriented to face in the same direction as the animal faces and/or walks when wearing the harness. To that end, it will serve as a "spotlight" to help navigate where an animal should walk and/or avoid (and/or scare) dangerous animals and insects while walking. In alternative embodiments of the present invention, the first lighting element 200 may autonomously pivot or change in intensity based on set programming and/or input from one or more sensors that control a servo motor. In further embodiments, the spotlight may autonomously pivot or change in intensity through use of a remote communicatively coupled to a receiver powered by the power source. The first lighting element 200 may be operably configured to emit a light of approximately 1000-3000 lumens.

The second light assembly 120 has a clip member 126 selectively removably coupled to the outer surface 112 of the body section 102 and a second lighting element 202 electrically coupled to the battery-powered power source 600, the first lighting element 200 operably configured to be oriented with respect to the second lighting element 202 to emit light at a substantially perpendicular angle θ therefrom, wherein a substantially perpendicular angle θ is defined as +/−20° from a 90° angle, i.e., an angle ranging approximately between 70° and 110°. Beneficially, this feature allows for the first and second light assemblies 118, 120 to illuminate a greater surface area as opposed to merely overlapping the same surface area with light. In another embodiment, this same function may be achieved by the location or placement of the light housing 124, 128 on the outer surface 112 of the body section 102 in conjunction with the orientation of the first and second lighting elements 200, 202 to emit light in different directions, i.e., not necessarily opposing directions but directions that share no more than, for example, 40% overlap in illuminated surface area. In one embodiment, the first and second light assemblies 118, 120 share the same battery-powered power source 600, whereas in alternate embodiments the first light assembly 118 has a battery-powered power source 600 that is independent from that of the second light assembly 120. The second lighting element 202 (that is designed for more area lighting) may be operably configured to emit a light of approximately 500-2000 lumens. The first and second lighting elements 118, 120 may include one or more light-emitting diodes ("LEDs") or other comparable lights oriented and configured to emit light as depicted and described herein. The second light assembly 120 with the second lighting element 202 may also be pivotably coupled to the outer surface 112 of the chest portion 110 of the body section 102 and interposed between the two selectively adjustable side apertures 106, 108, wherein the first lighting element 200 is oriented with respect to the second lighting element 202 to emit light at a substantially perpendicular angle therefrom, wherein a substantially perpendicular angle θ is defined as +/−20° from a 90° angle, i.e., an angle ranging approximately between 70° and 110°.

In a preferred embodiment, the harness 100 further comprises a front panel 130 directly coupled to the outer surface 112 of the chest portion 110 and defining a front pocket 210 defining on opposing sides thereof and with a portion of the clip members 122, 126 of the respective first and second light assemblies 118, 120 disposed therein and another portion of the clip members 122, 126 of the respective first and second light assemblies 118, 120 coupled to the front panel 130. The first lighting element 200 may be operably configured to pivot using one or more pivot points that may be frictionally restricted to resist movement when set by the user. As such and for example, the front panel 130 may be selectively removably coupled to, and at least partially overlaying, the first and second light assemblies 118, 120, wherein a portion of the front panel 130 may include attachment portions for the pivot point of the first lighting element 200. In one embodiment, the front panel 130 utilizes a substantially rigid mounting bracket having the attachment portion enabling selective engagement to (and pivoting of) the first lighting element 200. In one embodiment, the first lighting element 200 may pivot (or rotate) approximately +/−30°, while in other embodiments, other pivoting ranges are possible. In a preferred embodiment, and due to the placement of the second lighting element 202 on the belly of the animal, only the first lighting element 200 is pivotable, while the second lighting element 202 underneath the chest portion is stationary. Further, in some embodiments, only two lights (as depicted in the figures) are utilized to address cost and manufacturing concerns.

The front panel 130 may be coupled to the chest portion 110 using stitching, adhesive, or other means enabling coupling to the outer surface 112 of the body section 102 and at least partially covering the first and second light assemblies 118, 120 and electrical/structural components. In one embodiment, the front panel 130 may be selectively removably coupled to the first and second light assemblies 118, 120 using one or more mushroom-shaped grommet(s). In other embodiments, the front panel 130 may be permanently attached to the body section 102 on one side of the front panel 130 using stitching, while having a fastener coupling the front panel 130 on the opposite side of the panel 130 to the body 102, e.g., using hook-and-loop fasteners.

Figure 5:
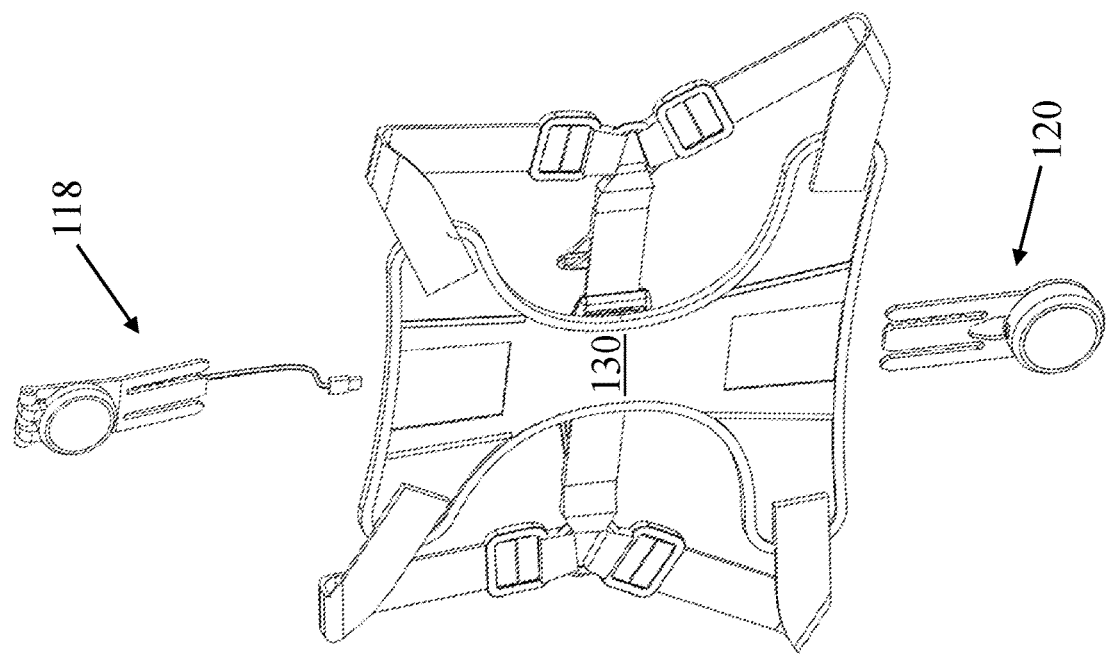
FIG. 5 depicts a perspective bottom view of an exemplary body section, first light assembly, and second light assembly, in accordance with another embodiment of the present invention.

In other versions of the present invention (to enable similar functionality as described above), the first and second light assemblies 118, 120 may be selectively removably coupled to the harness 100 using industrial hook-and-loop straps or fasteners or clips (as best seen in FIG. 5). In another version of the present invention, the first and second light assemblies 118, 120, electrical component(s), and the battery-powered power source 600 may be embedded into the harness 100 and configured and oriented as described above.

In accordance with a further feature, the light housing 124 of the first lighting assembly 118 is lockably pivotably coupled to the clip member 122 of the first light assembly 118 and the outer surface 112 of the body section 102. The first lighting assembly 118 may be lockably pivotably coupled using a tongue-and-groove ratcheting system, a screw tensioner, etc. In contrast, a light housing 128 of the second lighting assembly 120 is non-pivotably coupled to the clip member 126 of the second light assembly 120 and the outer surface 112 of the body section 102 because the second lighting element 202 is operably configured to illuminate the area under the dog as opposed to the area in front of, behind, and surrounding the dog.

Figure 2:
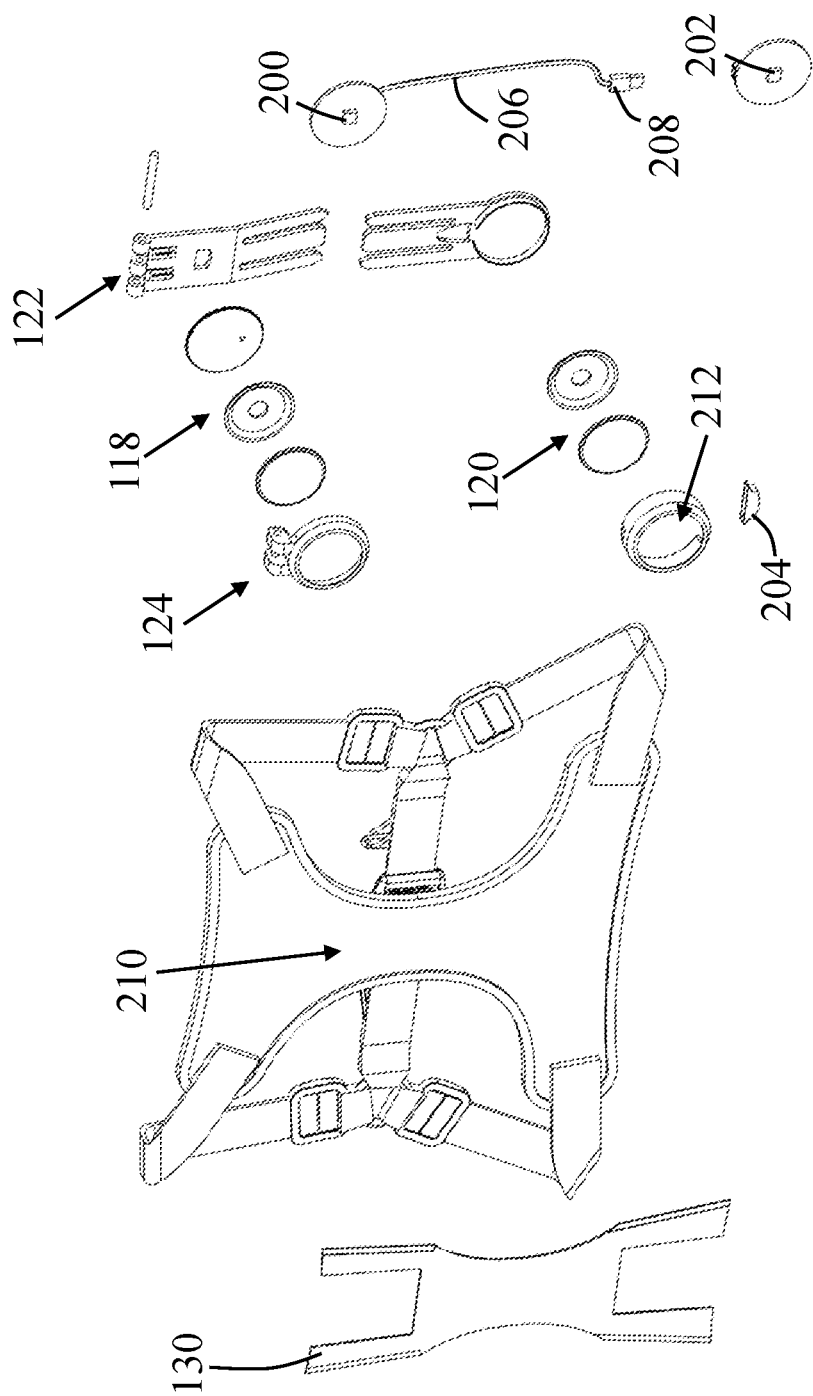
FIG. 2 depicts partially exploded, perspective views of an illuminating pet harness in accordance with one embodiment of the present invention.
Figure 3:
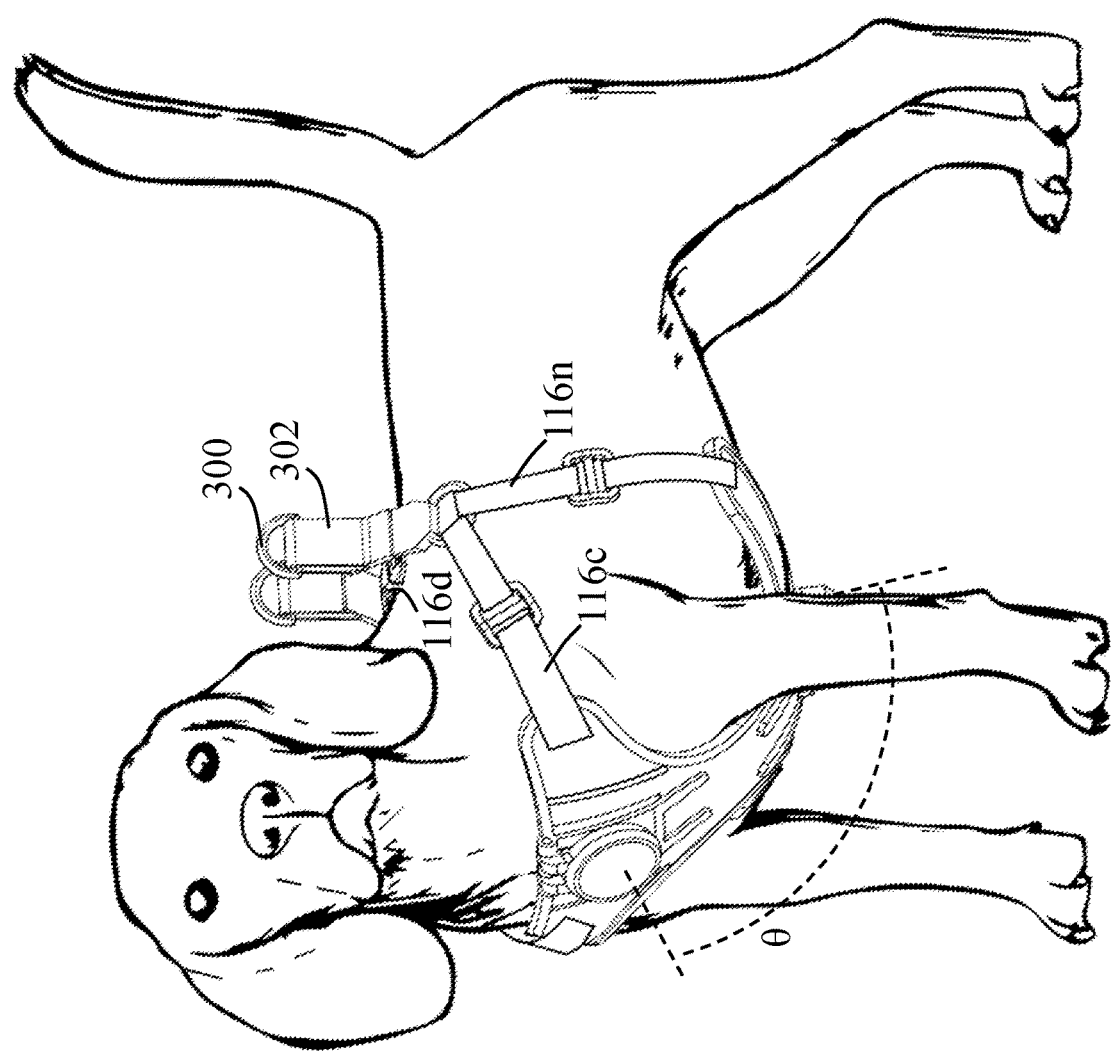
FIG. 3 depicts an exemplary embodiment of an illuminating pet harness worn on a dog, in accordance with the present invention.
Figure 4:
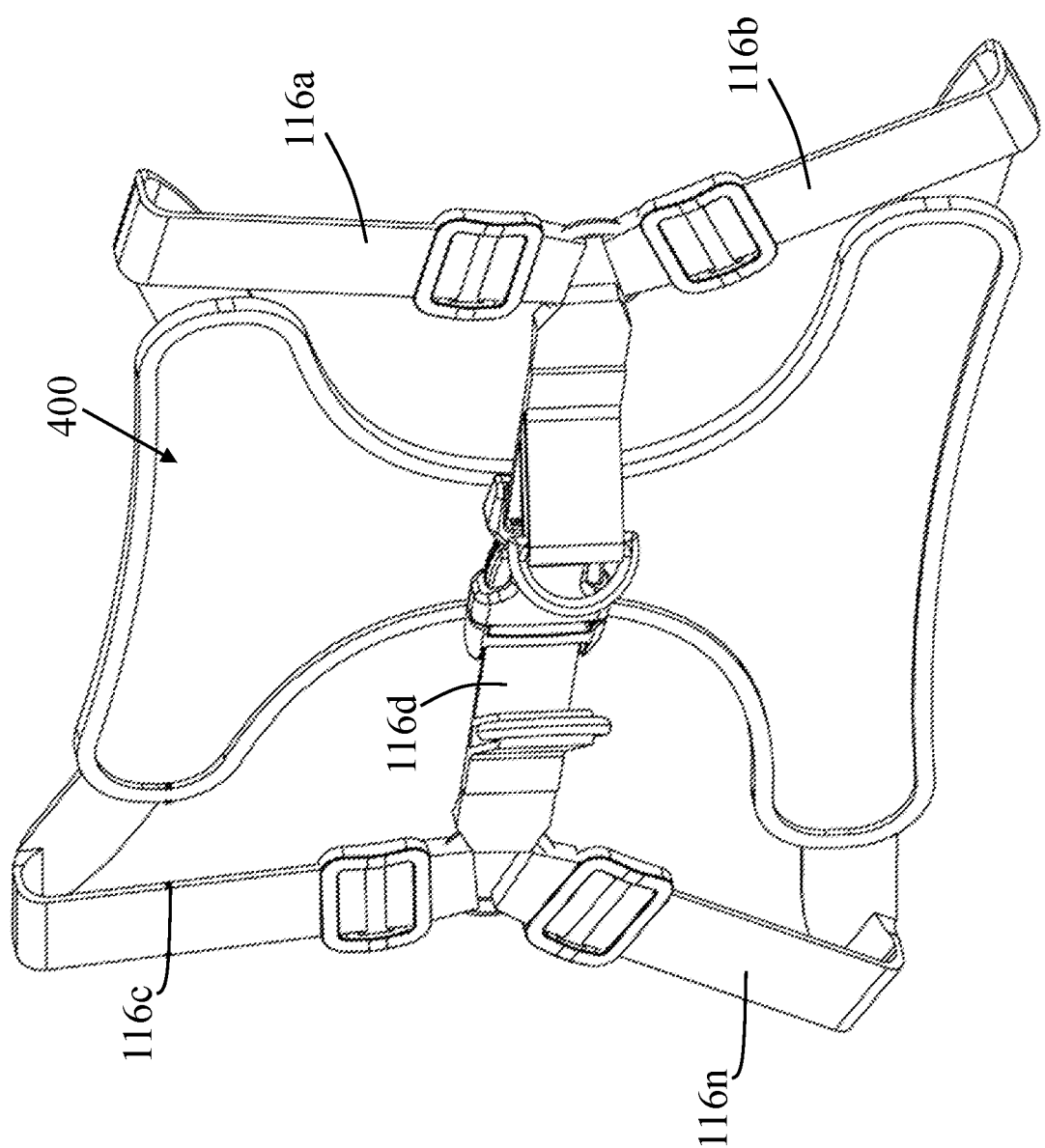
FIG. 4 depicts a perspective top view of an illuminating pet harness, in accordance with one embodiment of the present invention.

In another embodiment, the light housing 124 of the first lighting assembly 118 is disposed proximal to the upper torso aperture 104 and the light housing 128 of the second lighting assembly 120 is interposed between the two selectively adjustable side apertures 106, 108. Said another way, the first lighting assembly 118 may be disposed at or near (within +/−1-2 inches) of a terminal edge that defines the upper torso aperture 104. The light housings 124, 128 are best depicted in FIG. 2 and, in an exemplary embodiment, are of a thermoplastic polymeric composition such as High-Density Polyethylene (HDPE) having characteristics of high tensile strength, large strength-to-density ratio, and a high-impact resistance and melting point.

The chest portion 110 may further comprise an upper edge 132 and a lower edge 134 opposing the upper edge 132, wherein the light housing 124 of the first lighting assembly 118 is disposed proximal to the upper edge 132 and the light housing 128 of the second lighting assembly 120 is disposed proximal to the lower edge 134, wherein proximal is defined as at or near (within +/−1-2 inches) of the upper or lower edge 132, 134, respectively. This placement beneficially expands the surface area that is illuminated by the first and second light assemblies 118, 120. In accordance with a further feature of this embodiment, the harness 100 further comprises the front panel 130 directly coupled to the outer surface 112 of the chest portion 110 and defines a front pocket 210 defining on opposing sides thereof and with a portion of the clip members 122, 126 of the respective first and second light assemblies 118, 120 disposed therein and another portion of the clip members 122, 126 of the respective first and second light assemblies 118, 120 coupled to the front panel 130. The front panel 130 may be directly coupled to the outer surface 112 of the chest portion 110 through a variety of methods including, by way of example, stitching, adhesive bonding, etc. In one embodiment, the clip members 122, 126 are selectively removably couplable to the front pocket 210 such that a user can selectively remove the clip members 122, 126 when light or illumination is not needed. In another embodiment, the clip members 122, 126 are directly coupled to the front pocket 210 such that they remain resident on the harness 100 and may be selectively turned on and off by a user when needed.

The body section 102 may further comprise a plurality of straps 116a-n coupled to the chest portion 110 and including a selectively adjustable back strap 116d coupled on opposing ends to a selectively adjustable left-side strap 116a-b and a selectively adjustable right-side strap 116c, 116n, the plurality of straps 116a-n defining the selectively adjustable upper torso aperture 104 and the two selectively adjustable side apertures 106, 108. The plurality of straps 116a-n are padded using, for example, a fabric material such as cotton, and in an exemplary embodiment the plurality of straps 116a-n are of a canvas fabric material. Canvas is a plain-woven fabric typically made out of cotton and, to a lesser extent, linen. Canvas fabric is known for being durable, sturdy, and heavy duty. By blending cotton with synthetic fibers, canvas can become water resistant or even waterproof, making it an ideal outdoor fabric, particularly for the plurality of straps 116a-n. Other deformably resilient materials, however, may be utilized for comfort to the pet (particularly in light of the electronic and structural components used on the outer surface of the harness). In a preferred embodiment, the body section 102 further comprises a D-ring attachment coupled, through a leash strap, to the back strap 116d to enable a user to readily and selectively hook the end of a dog leash to the harness 100 through the D-ring attachment. Beneficially, the harness 100 may be used with or without a leash, as the user desires, to readily pinpoint, through the illuminating light, the exact location of a dog wearing the harness 100. The plurality of straps 116a-n are selectively adjustable, allowing the harness 100 to be used on different sized and shaped canines.

As best depicted in the flowchart diagram of FIG. 6, the harness 100 further comprises an electrical switch 204 coupled to a cover 212 of the light housing 128 of the second light assembly 120 and operably configured to complete a circuit electrically coupling the first and second lighting elements 200, 202 to the battery powered power source 600. When the electrical switch 204 is turned on, the first and second lighting elements 200, 202 are activated and illuminated to light the way. A remote control 602 communicatively coupled to the electrical switch 204 is operably configured to cause completion and disconnection of the electrical circuit and selectively lumen intensity of the first and second lighting elements 200, 202. This feature beneficially allows a user to selectively turn the first and second lighting elements 200, 202 on or off remotely from a distance away using the remote control 602 or, alternatively, to turn the first and second lighting elements 200, 202 on or off directly and manually from the electrical switch 204, depending on the preference or ability, at any given point in time, of the user. In another embodiment, the electrical switch 204 is operably configured to complete a circuit with only one of the first or second lighting elements 200, 202. The remote control 602 is preferably a single button remote keyless system, also commonly referred to as a FOB, with the ability to control both the first and second lighting elements 200, 202.

In accordance with a further feature, the first and second lighting elements 200, 202 of the first and second light assemblies 118, 120 are electrically coupled to the same battery-powered power source 600 with an electrical wire 206 spanning through a front pocket 210 defined by a front panel 130 directly coupled to the outer surface 112 of the chest portion 110. As seen at least in FIG. 2, the electrical wire may also beneficially include an electrical connector 208 coupling the first and second lighting elements 200, 202. In preferred embodiments, the electrical wire 206 is substantially planar, wherein planar is defined as flat or in the form of a plane, so as to minimize a dog's discomfort when wearing the harness 100, i.e., the more planar the wire 206, the less it digs into the dog's belly.

As such, the user will place and couple the harness 100 on the pet/animal and then activate (when desired) one or more switch(es) to complete a circuit with the first and second light assemblies 118, 120 and the battery-powered power source 600, thereby emitting light to the one or both of the lighting element(s) 200, 202. The user may selectively adjust the intensity of the lights from the first and second light assemblies 118, 120 through one or more electrical switch(es) 204 on the harness 100 and/or through a remote 602 communicatively coupled to the first and second light assemblies 118, 120. Therefore, an effective, efficient, and safe illuminated pet harness 100 is disclosed that helps safely and effectively guide the animal (and user) while walking. Any dimensions of the harness 100 depicted or described herein are exemplary, and dimensions outside of any dimensions may be utilized.

As seen in the figures, the lighting elements (e.g., LEDs) 200, 202 may be selectively removably coupled to the front panel 130 using one or more compression clips. Said differently, the lights 200, 202 are configured with the clips 122, 126 that are shaped and sized to slide from the top (as opposed to the sides) of the panel 130 into one or more channels formed on the body section 102 and panel 103, whereby a portion of the harness/panel is engaged with a portion of the compression clip, thereby securing it thereto at the desired position. In another embodiment of the present invention, the lights 200, 202 may mechanically engage with one another (e.g., using a clip/fastener configuration) and the harness/panel. Like the lights described above, the upper or first light 200 may be pivoted to the desired orientation and may be operable to rotate up to approximately 180°. The lights 200, 202 may also electrically couple to each as described above.

Although a specific order of executing the process steps, the order of executing the steps may be changed relative to the order shown in certain embodiments. Also, two or more steps described as occurring in succession may be executed concurrently or with partial concurrence in some embodiments. Certain steps may also be omitted for the sake of brevity. In some embodiments, some or all of the process steps can be combined into a single process.

What is claimed is:

1. An illuminating pet harness comprising:
   a body section defining a selectively adjustable upper torso aperture, two selectively adjustable side apertures, having a chest portion of a padded material and including an upper edge, a lower edge opposing the upper edge, an inner surface, and an outer surface opposing the inner surface of the chest portion;
   a first light assembly having a clip member selectively removably coupled to the outer surface of the body section and having a first lighting element electrically coupled to a battery-powered power source and disposed on a light housing disposed proximal to the upper edge of the chest portion and pivotably coupled to the clip member of the first light assembly and the outer surface of the body section; and
   a second light assembly having a clip member selectively removably coupled to the outer surface of the body section and having a second lighting element electrically coupled to the battery-powered power source and disposed on a light housing disposed proximal to the lower edge of the chest portion, the first lighting element operably configured to be oriented with respect to the second lighting element to emit light at a substantially perpendicular angle θ from the first lighting element.

2. The illuminating pet harness according to claim 1, further comprising:
   a front panel directly coupled to the outer surface of the chest portion and defining a front pocket defining on opposing sides thereof and with a portion of the clip members of the respective first and second light assemblies disposed therein and another portion of the clip members of the respective first and second light assemblies coupled to the front panel.

3. The illuminating pet harness according to claim 1, wherein:
   the light housing of the first lighting assembly is lockably pivotably coupled to the clip member of the first light assembly and the outer surface of the body section.

4. The illuminating pet harness according to claim 3, wherein:
   the light housing of the first lighting assembly is disposed proximal to the upper torso aperture and a light housing of the second lighting assembly is interposed between the two selectively adjustable side apertures.

5. The illuminating pet harness according to claim 3, further comprising:
a remote control communicatively coupled to the electrical switch and operably configured to cause completion and disconnection of the circuit and selectively generate lumen intensity of the first and second lighting elements.

6. The illuminating pet harness according to claim 1, further comprising:
a front panel directly coupled to the outer surface of the chest portion and defining a front pocket defining on opposing sides thereof and with a portion of the clip members of the respective first and second light assemblies disposed therein and another portion of the clip members of the respective first and second light assemblies coupled to the front panel.

7. The illuminating pet harness according to claim 1, wherein the body section further comprises:
a plurality of straps coupled to the chest portion and including a selectively adjustable back strap coupled on opposing ends to a selectively adjustable left-side strap and a selectively adjustable right-side strap, the plurality of straps defining the selectively adjustable upper torso aperture and the two selectively adjustable side apertures.

8. The illuminating pet harness according to claim 7, wherein the body section further comprises:
a D-ring coupled, through a leash strap, to the back strap.

9. The illuminating pet harness according to claim 1, further comprising:
an electrical switch coupled to a cover of the light housing of the second light assembly and operably configured to complete a circuit electrically coupling the first and second lighting elements to the battery powered power source.

10. The illuminating pet harness according to claim 1, wherein:
the first and second lighting elements of the first and second light assemblies, respectively, are electrically coupled to the same battery-powered power source with an electrical wire spanning through a front pocket defined by a front panel directly coupled to the outer surface of the chest portion.

11. An illuminating pet harness comprising:
a body section defining a selectively adjustable upper torso aperture and two selectively adjustable side apertures and having a chest portion of a padded material and including an inner surface and an outer surface opposing the inner surface of the chest portion, the body section a front panel directly coupled to the outer surface of the chest portion and defining a front pocket defining on opposing sides thereof;
a first light assembly having a clip member selectively removably coupled to the outer surface of the body section and having a first lighting element electrically coupled to a battery-powered power source and disposed on a light housing pivotably coupled to the clip member of the first light assembly and the outer surface of the body section, the light housing disposed proximal to the upper torso aperture; and
a second light assembly having a clip member selectively removably coupled to the outer surface of the body section and having a second lighting element electrically coupled to the battery-powered power source and disposed on a light housing pivotably coupled to the clip member of the second light assembly, the light housing interposed between the two selectively adjustable side apertures, the first and second lighting elements oriented to emit light in different directions, and with a portion of the clip members of the respective first and second light assemblies disposed within the front pocket and another portion of the clip members of the respective first and second light assemblies coupled to the front panel.

12. The illuminating pet harness according to claim 11, further comprising:
the light housing of the first lighting assembly is lockably pivotably coupled to the clip member of the first light assembly and the outer surface of the body section.

13. The illuminating pet harness according to claim 12, wherein:
the light housing of the first lighting assembly is disposed proximal to the upper torso aperture and a light housing of the second lighting assembly is interposed between the two selectively adjustable side apertures.

14. The illuminating pet harness according to claim 11, wherein the chest portion further comprises:
an upper edge and a lower edge opposing the upper edge, wherein the light housing of the first lighting assembly is disposed proximal to the upper edge and the light housing of the second lighting assembly is disposed proximal to the lower edge.

15. The illuminating pet harness according to claim 14, further comprising:
a front panel directly coupled to the outer surface of the chest portion and defining a front pocket defining on opposing sides thereof and with a portion of the clip members of the respective first and second light assemblies disposed therein and another portion of the clip members of the respective first and second light assemblies coupled to the front panel.

16. The illuminating pet harness according to claim 11, wherein the body section further comprises:
a plurality of straps coupled to the chest portion and including a selectively adjustable back strap coupled on opposing ends to a selectively adjustable left-side strap and a selectively adjustable right-side strap, the plurality of straps defining the selectively adjustable upper torso aperture and the two selectively adjustable side apertures.

17. The illuminating pet harness according to claim 11, further comprising:
an electrical switch coupled to a cover of the light housing of the second light assembly and operably configured to complete a circuit electrically coupling the first and second lighting elements to the battery powered power source.

18. An illuminating pet harness comprising:
a body section defining a selectively adjustable upper torso aperture, two selectively adjustable side apertures, having a chest portion of a padded material and including an inner surface, and an outer surface opposing the inner surface of the chest portion;
a first light assembly having a clip member selectively removably coupled to the outer surface of the body section and having a first lighting element electrically coupled to a battery-powered power source and disposed on a light housing disposed proximal to the upper torso aperture and pivotably coupled to the clip member of the first light assembly and the outer surface of the body section; and
a second light assembly having a clip member selectively removably coupled to the outer surface of the body section and having a second lighting element electrically coupled to the battery-powered power source and disposed on a light housing interposed between the two selectively adjustable side apertures, the first lighting element operably configured to be oriented with respect to the second lighting element to emit light at a substantially perpendicular angle θ from the first lighting element.

19. An illuminating pet harness comprising:
a body section defining a selectively adjustable upper torso aperture, two selectively adjustable side apertures, having a chest portion of a padded material and including an inner surface and an outer surface opposing the inner surface of the chest portion, and having a plurality of straps coupled to the chest portion and including a selectively adjustable back strap coupled on opposing ends to a selectively adjustable left-side strap and a selectively adjustable right-side strap, the plurality of straps defining the selectively adjustable upper torso aperture and the two selectively adjustable side apertures;
a D-ring coupled, through a leash strap, to the back strap;
a first light assembly having a clip member selectively removably coupled to the outer surface of the body section and having a first lighting element electrically coupled to a battery-powered power source and disposed on a light housing pivotably coupled to the clip member of the first light assembly and the outer surface of the body section; and
a second light assembly having a clip member selectively removably coupled to the outer surface of the body section and having a second lighting element electrically coupled to the battery-powered power source, the first lighting element operably configured to be oriented with respect to the second lighting element to emit light at a substantially perpendicular angle θ from the first lighting element.

20. An illuminating pet harness comprising:
a body section defining a selectively adjustable upper torso aperture, two selectively adjustable side apertures, having a chest portion of a padded material and including an inner surface, and an outer surface opposing the inner surface of the chest portion;
a first light assembly having a clip member selectively removably coupled to the outer surface of the body section and having a first lighting element electrically coupled to a battery-powered power source and disposed on a light housing pivotably coupled to the clip member of the first light assembly and the outer surface of the body section;
a second light assembly having a clip member selectively removably coupled to the outer surface of the body section and having a second lighting element electrically coupled to the battery-powered power source, the first lighting element operably configured to be oriented with respect to the second lighting element to emit light at a substantially perpendicular angle θ from the first lighting element; and
a remote control communicatively coupled to an electrical switch coupled to at least one of the body section, the first light assembly, and the second light assembly and operably configured to cause a completion and a disconnection of a circuit electrically coupling the first and second lighting elements to the battery-powered power source and to selectively generate lumen intensity of the first and second lighting elements.

21. An illuminating pet harness comprising:
a body section defining a selectively adjustable upper torso aperture, two selectively adjustable side apertures, having a chest portion of a padded material and including an inner surface and an outer surface opposing the inner surface of the chest portion, the chest portion including a front pocket defined by a front panel directly coupled to the outer surface of the chest portion;
a first light assembly having a clip member selectively removably coupled to the outer surface of the body section and having a first lighting element electrically coupled to a battery-powered power source and disposed on a light housing pivotably coupled to the clip member of the first light assembly and the outer surface of the body section; and
a second light assembly having a clip member selectively removably coupled to the outer surface of the body section and having a second lighting element electrically coupled to the battery-powered power source, the first lighting element operably configured to be oriented with respect to the second lighting element to emit light at a substantially perpendicular angle θ from the first lighting element and the first and second lighting elements of the first and second light assemblies, respectively, are electrically coupled to the same battery-powered power source with an electrical wire spanning through the front pocket.

* * * * *